(12) United States Patent
Yabe et al.

(10) Patent No.: US 8,274,555 B2
(45) Date of Patent: Sep. 25, 2012

(54) IMAGE SYNTHESIZING APPARATUS AND IMAGE SYNTHESIZING METHOD

(75) Inventors: Hiroaki Yabe, Matsudo (JP); Hiroyuki Katata, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 1351 days.

(21) Appl. No.: 11/665,005

(22) PCT Filed: Nov. 2, 2005

(86) PCT No.: PCT/JP2005/020210
§ 371 (c)(1),
(2), (4) Date: Apr. 10, 2007

(87) PCT Pub. No.: WO2006/049208
PCT Pub. Date: May 11, 2006

(65) Prior Publication Data
US 2009/0009591 A1   Jan. 8, 2009

(30) Foreign Application Priority Data
Nov. 8, 2004  (JP) .................................. 2004-323611

(51) Int. Cl.
*H04N 15/00* (2006.01)
*H04N 5/445* (2006.01)

(52) U.S. Cl. ........... 348/51; 348/563; 348/564; 348/565

(58) Field of Classification Search .............. 348/42–60, 348/563–565; 345/664, 665
See application file for complete search history.

(56) References Cited

U.S. PATENT DOCUMENTS

2003/0016842 A1 * 1/2003 Patton et al. .................. 382/100

FOREIGN PATENT DOCUMENTS

| JP | 63-002497 | | 1/1988 |
|---|---|---|---|
| JP | 9-160143 | A | 6/1997 |
| JP | 11-088912 | | 3/1999 |
| JP | 11-127457 | A | 5/1999 |
| JP | 2004-274091 | | 9/2004 |

OTHER PUBLICATIONS

International Search Report mailed Dec. 6, 2005 (English and Japanese Translations).
English translation of International Preliminary Report on Patentability mailed May 18, 2007 in corresponding PCT Application No. PCT/JP2005/020210.

* cited by examiner

*Primary Examiner* — Ario Etienne
*Assistant Examiner* — Hee Kim
(74) *Attorney, Agent, or Firm* — Nixon & Vanderhye P.C.

(57) ABSTRACT

A stereoscopic image supplier acquires stereoscopic image data in a side-by-side layout format. Visual information supplier acquires visual information to be added to a stereoscopic image. Based on a 3D display for displaying a stereoscopic image, a 3D display information supplier acquires the coordinates of portions that are not used for 3D display representation as the coordinates of the pixels with which visual information is combined. An image synthesizer combines visual information obtained at Step S2 with the pixel at the coordinates set at Step S3. Visual information is combined with all the portions at the coordinates to be processed, and the image with visual information synthesized is stored in a stereo image storage. In this way, if additional information is added to the stereoscopic image, no uncomfortable feeling will occur when the image is viewed in stereoscopic vision.

6 Claims, 10 Drawing Sheets

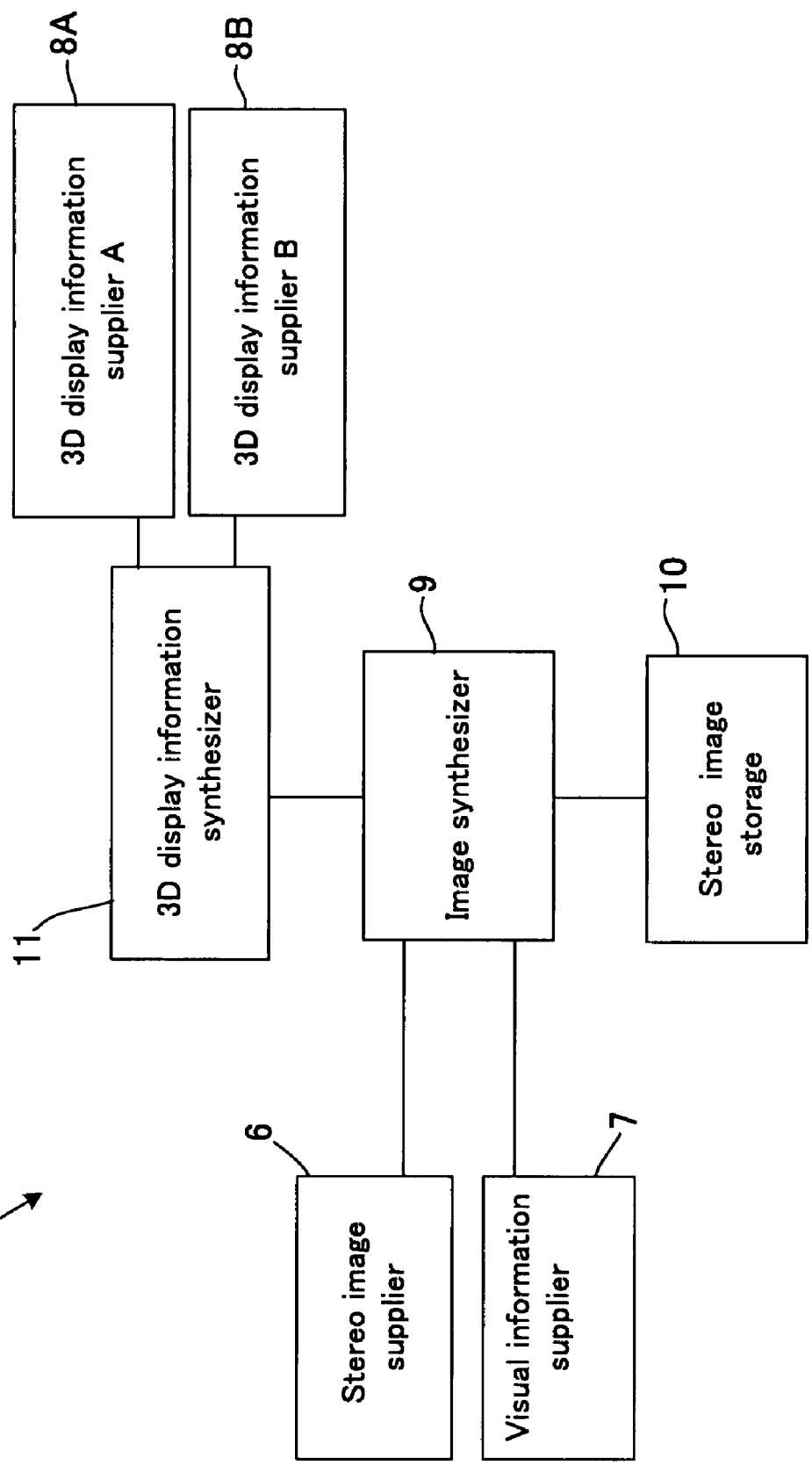

Image for parallel viewing technique

Image for crossed viewing technique

Viewpoint positions for parallel viewing technique

Viewpoint positions for crossed viewing technique

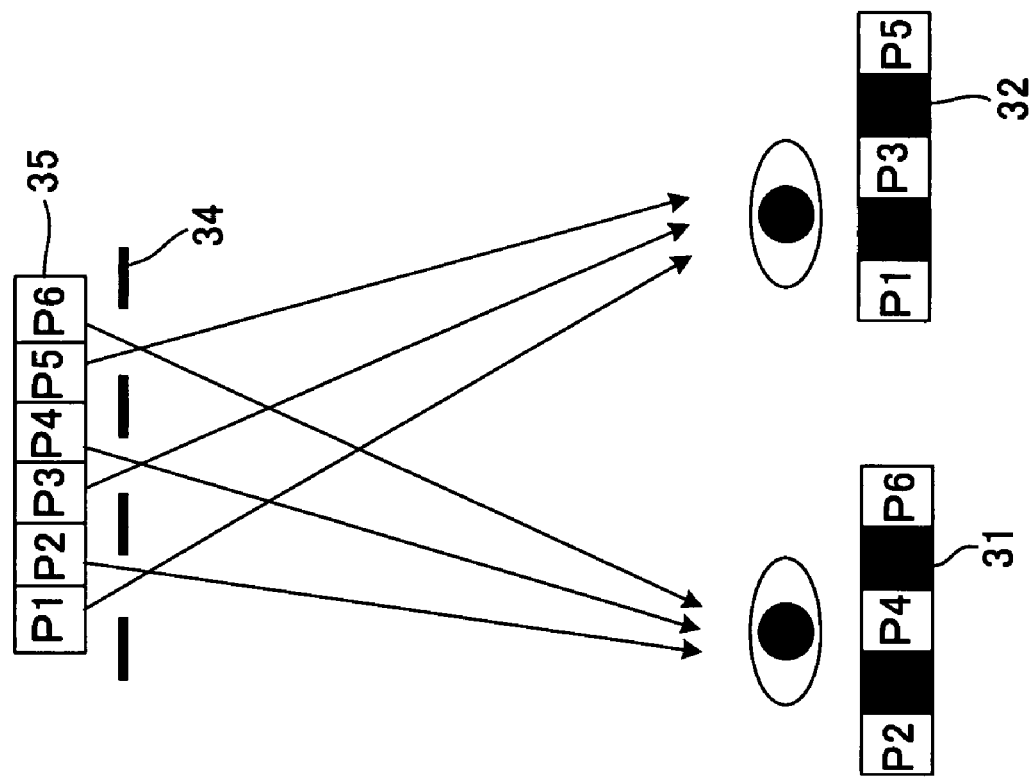

IMAGE SYNTHESIZING APPARATUS AND IMAGE SYNTHESIZING METHOD

This application is a U.S. national phase of International Application No. PCT/JP2005/020210 filed 2 Nov. 2005, which designated the U.S. and claims priority to JP 2004-323611 filed 8 Nov. 2004, the entire contents of each of which are hereby incorporated by reference.

TECHNICAL FIELD

The present invention relates to an image synthesizing apparatus and image synthesizing method for enabling addition of visible information to a stereoscopic image.

BACKGROUND ART

Conventionally, stereoscopic vision which produces stereoscopic effect by presenting different images to the left and right eyes have been studied. For example, a technique called autostereoscopy have been widely known, which produces stereoscopic effect by arranging images viewed from left and right viewpoints, side by side, and viewing the image for right-eye through the right eye and the image for left-eye through the left eye while the user is defocusing their eyes.

Techniques for autostereoscopy include parallel viewing technique described with FIGS. 7(a) and 8(a) and crossed viewing technique described with FIGS. 7(b) and 8(b). In the parallel viewing technique, a stereoscopic image having a left-eye image 31 and a right-eye image 32 arranged on the left and right, respectively, as shown in FIG. 7(a) is viewed in such a manner that the right eye views right-eye image 32 arranged on the right and left eye views the left-eye image 31 arranged on the left with their focal points adjusted at a point more interior than the image, as shown in FIG. 8(a). In crossed viewing technique, a stereoscopic image having an left-eye image 31 and an right-eye image 32 arranged on the right and left, respectively, as shown in FIG. 7(b) is viewed in such a manner that the right eye views right-eye image 32 arranged on the left and the left eye views left-eye image 31 arranged on the right with their focal points adjusted at a point before the image, as shown in FIG. 8(b).

Also a 3D display which provides stereoscopic vision using binocular parallax by placing a slit plate 34 in front of a liquid crystal panel 33 as shown in FIG. 9(a) has been developed. Specifically, as shown in FIG. 9(b) a displayed image 35 for 3D display, which is composed of images for left and right eyes, arranged alternately, is displayed on liquid crystal panel 33, and when the image is viewed over slit plate 34, left-eye image 31 can be viewed by the left eye and right-eye image 32 can be viewed by the right eye.

A displayed image for 3D display is prepared by synthesizing left-eye and right-eye images in accordance with the specification of the slit plate. For example, if the width of the apertures and that of shading portions of the slit plate used for a 3D display are equal to one pixel-width of the liquid crystal panel, pixels in odd-numbered columns of the left-eye image and pixels in even-numbered columns of the right-eye image are picked up and arranged side by side alternately, forming a displayed image for 3D display, as shown in FIG. 10.

Since there is no particular stereoscopic image format defined for general purposes, as the methods frequently used for storage of a stereo image, in some cases the left-eye image and the right-eye image are stored as separate image files with a separate record of the correspondence between the left-eye image and the right-eye image for the stereoscopic image; in other cases a single image in which the left-eye image and the right-eye image are arranged left and right and synthesized is stored as a stereoscopic image format.

Particularly, since the latter format is easily viewed in autostereoscopic mode when it is displayed with usual 2D image display software, this is widely used as a stereoscopic image format. However, this format has the problem that it is impossible to determine whether the format made up of images arranged left and right is for crossed viewing mode or for parallel viewing mode, at a sight of the images.

Further, if an unskilled person without knowledge of stereoscopic vision handles such format images arranged left and right to display on a usual 2D display, they may take it for device failure since akin images are displayed side by side; or if the image doubled in width compared to a normal 2D image because two images are arranged left and right, is printed by a printing service for digital camera images, the central part of the images arranged left and right is trimmed and printed, possibly causing a feeling that the printing service is problematic.

As a counter measure to solve the above problems, it is preferable to provide a means for making the user understand such an image as a stereoscopic image at a glance, by adding information that indicates the entity of a stereo image within the image. For example, the invention disclosed in Patent document 1 proposes a method of adding distinction information of left and right below the images, by mounting a stereoscopic adapter to a camera when a stereoscopic image is shot by the camera.

Patent document 1:
  Japanese Patent Application Laid-open Hei 9-160143

DISCLOSURE OF INVENTION

Problems to be Solved by the Invention

However, when a stereoscopic image added with distinction information as in Patent document 1 is displayed on a 3D display, the information added to the image becomes an obstacle and causes the problem that the user feels uncomfortable sensation when viewing it as a stereo image.

In view of the above circumstances, it is an object of the invention to provide an image synthesizing apparatus and image synthesizing method which will not cause the user to feel any uncomfortable sensation when viewing a stereoscopic image in stereoscopic vision even if additional information is added to the stereoscopic image.

Means for Solving the Problems

An image synthesizing apparatus of the present invention comprises: a stereoscopic image input means for inputting a stereoscopic image; a visual information input means for inputting visual information to be added to the stereoscopic image; and a synthesizing means for synthesizing the visual information and the stereo image, and is characterized in that the visual information is synthesized over a portion in the stereoscopic image at a coordinate that will not be used for stereoscopic representation.

The image synthesizing apparatus is characterized in that the coordinate is a coordinate of a pixel to be thinned out from the stereoscopic image when the image is displayed in stereoscopic representation.

The image synthesizing apparatus is characterized in that the coordinate is a coordinate of a pixel to be thinned out from the stereoscopic image when the image is displayed in stereoscopic representation based on any of a plurality of stereoscopic display schemes.

An image synthesizing method of the present invention includes: a stereoscopic image input step of inputting a stereoscopic image; a visual information input step of inputting visual information to be added to the stereoscopic image; and a synthesis step of synthesizing the visual information and the stereoscopic image, and is characterized in that the visual information is synthesized over a portion in the stereoscopic image at a coordinate that will not be used for stereoscopic representation.

The image synthesizing method is characterized in that the coordinate is a coordinate of a pixel to be thinned out from the stereoscopic image when the image is displayed in stereoscopic representation.

The image synthesizing method is characterized in that the coordinate is a coordinate of a pixel to be thinned out from the stereoscopic image when the image is displayed in stereoscopic representation based on any of a plurality of stereoscopic display schemes.

Effect of the Invention

According to the present embodiment, it is possible to add visual information that allows the user to distinguish between left and right images of a stereoscopic image and recognize an indication of a stereoscopic image while it is also possible that the visual information will not be displayed when the stereoscopic image added with the visual information is displayed on a 3D display. Accordingly, it is possible to read the visual information when the stereoscopic image is displayed as a 2-dimensional image and it is also possible to enjoy stereoscopic vision without being disturbed by the visual information when the stereoscopic image is displayed in stereo.

BRIEF DESCRIPTION OF THE DRAWINGS

FIG. 5 is a system block diagram showing an image synthesizing apparatus according to the second example embodiment.

FIG. 9(a) and FIG. 9(b) are views showing the principle of 3D display.

Figure 1:
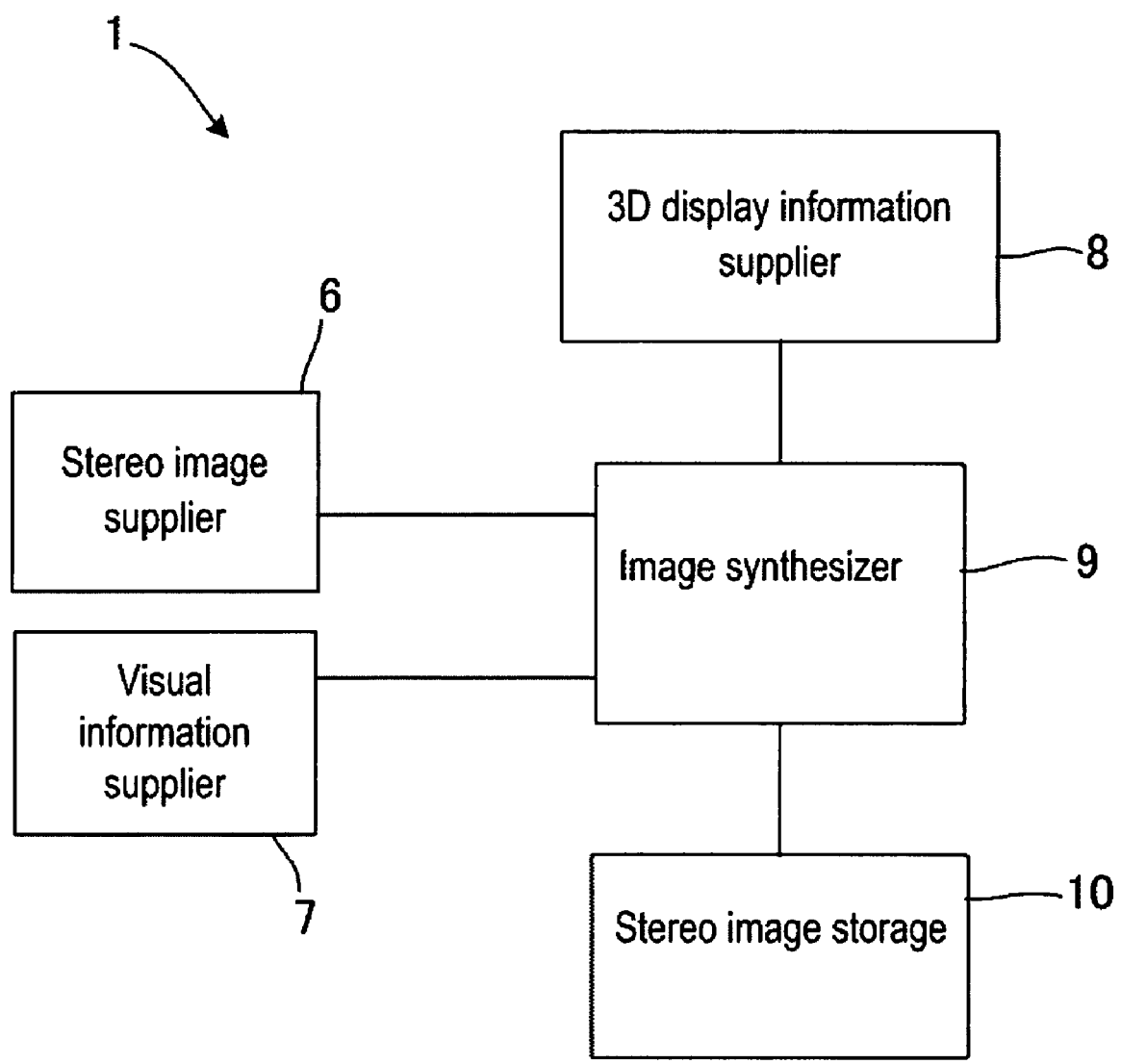
FIG. 1 is a system block diagram showing an image synthesizing apparatus according to a first example embodiment.

DESCRIPTION OF REFERENCE NUMERALS 1, 2 image synthesizing apparatus
6 stereoscopic image supplier
7 visible information supplier
8 3D display information supplier
8A 3D display information supplier A
8B 3D display information supplier B
9 image synthesizer
10 stereoscopic image storage
11 3D display information synthesizer
21, 31 left-eye image
22, 32 right-eye image
23, 35 displayed image for a 3D display
21B left-eye image (the hatch portion indicates the pixels used for the representation on display B)
22B right-eye image (the hatch portion indicates the pixels used for the representation on display B)
23B displayed image for 3D display B
33 liquid crystal panel
34 slit plate

BEST MODE FOR CARRYING OUT THE INVENTION

Next, the embodied modes of the present invention will be described with reference to the accompanying drawings.

FIG. 1 is a block diagram showing an image synthesizing apparatus according to the first embodiment of the present invention. This image synthesizing apparatus 1 is comprised of, as shown in FIG. 1, a stereoscopic image supplier 6, a visible information supplier 7, a 3D display information supplier 8, an image synthesizer 9 and a stereoscopic image storage 10.

Stereoscopic image supplier 6 is a portion that receives a supply of stereoscopic images from without and supplies stereoscopic images. Visible information supplier 7 is a portion that receives a supply of visible information (information on text images etc., to be added to stereoscopic images) from without and supplies visible information. Supply of stereo images and visible information from without is given through networks such as the internet, LAN etc., or from accumulating devices such as hard disks and the like.

The present embodiment handles a 3D display (stereoscopic image display device), which is a display having vertical slits arranged in front of a liquid crystal panel and capable of presenting autostereoscopic vision. When a stereoscopic image is displayed on a 3D display of this type, part of the pixels of the stereoscopic image is thinned out to display. Accordingly, of the stereoscopic image data there are pixels that are unused for stereoscopic representation. 3D display information supplier 8 supplies coordinate data (3D display information) of the pixels that will be unused (thinned out) for the visual representation on the 3D display. Image synthesizer 9 combines the pixels that will not be used for the visual representation with visual information supplied from visual information supplier 7. Stereoscopic image storage 10 stores the stereoscopic image after the visual information has been synthesized.

Three-dimensional display information supplier 8 receives 3D display information from the outside (from a network or accumulating device) and supplies 3D display information. However, if the 3D display to be used is known beforehand, it is possible to have the 3D information previously stored therein so that the 3D information can be supplied to image synthesizer 9.

Here, the stereoscopic image data supplied from stereoscopic image supplier 6 is assumed to be stereoscopic image data having a side-by-side layout format. The visual information supplied from visual information supplier 7 is information, such as text and the like, to be combined with the stereoscopic image in the side-by-side layout format and displayed, and is assumed to be image data having shapes of alphabet letters 'L' and 'R' in the embodiment. It is also assumed that the displayed image for 3D display is an image that is made up of even-numbered columns of pixels from the left-eye image and odd-numbered columns of pixels from the right-eye image, the columns being arranged alternately.

Figure 2:
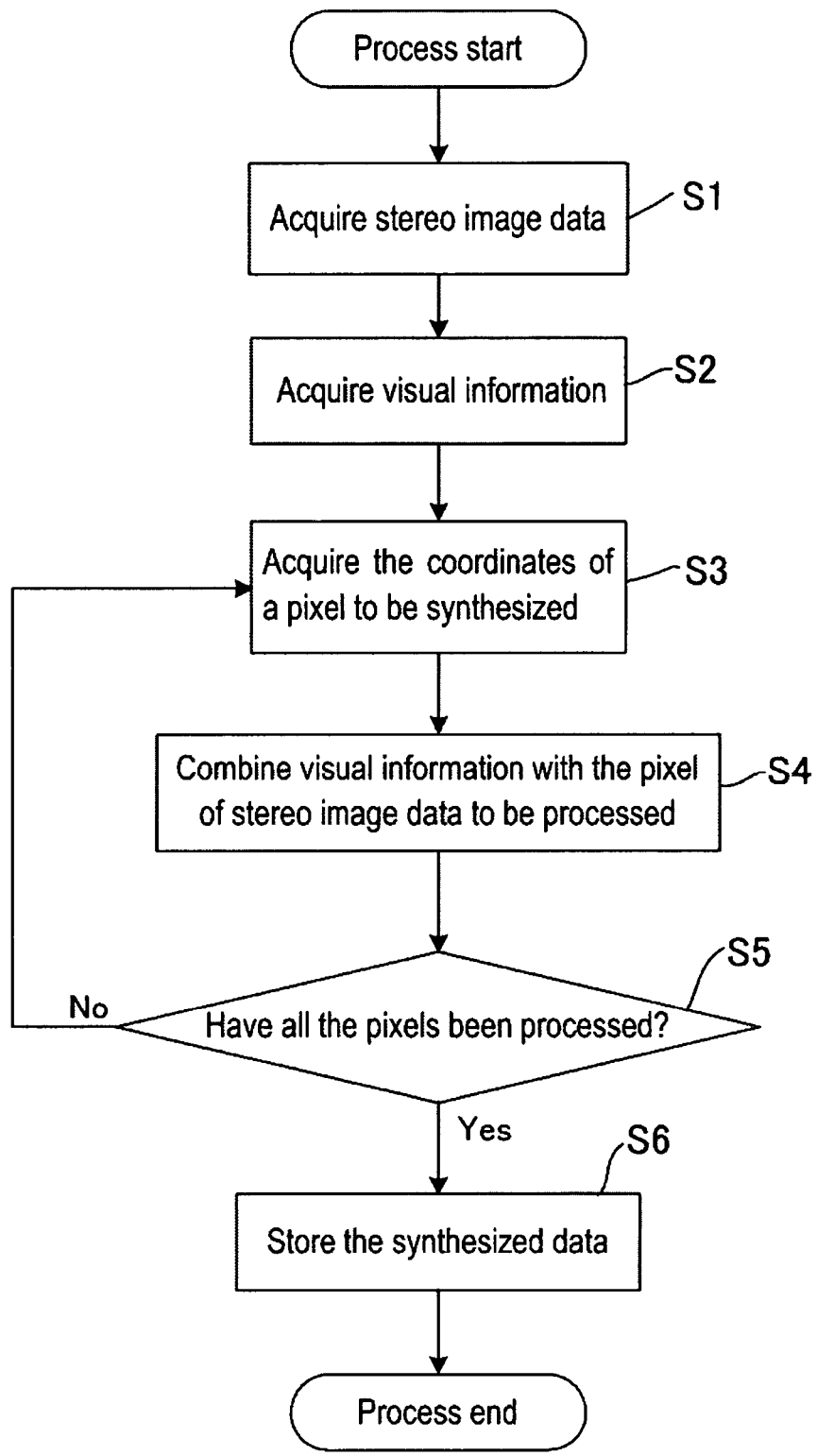
FIG. 2 is a flowchart showing an image synthesizing method according to the first example embodiment.

Hereinbelow, the operation of the present image synthesizing apparatus and the detail of the synthesizing technique will be described using a flowchart shown in FIG. 2.

At Step S1, stereoscopic image supplier 6 acquires (or is supplied from outside with) stereoscopic image data in side-by-side layout format. At Step S2, visual information supplier 7 acquires (or is supplied from outside with) visual information to be added to (synthesized with) the stereo image.

At Step S3, in accordance with the 3D display for displaying a stereoscopic image, 3D display information supplier 8 acquires (or is supplied from outside with) the coordinate that is unused for 3D display representation, as the coordinates of pixels (picture elements) with which the visual information is combined.

In the present embodiment, it is assumed that odd-numbered coordinates of the left-eye image and even-numbered coordinates of the right-eye image are used as the coordinates for 3D display representation. In this case, the coordinates (3D display information) acquired at Step S3 are the even-numbered coordinates of the left-eye image and the odd-numbered coordinates of the right-eye image. At Step S4, image synthesizer 9 synthesizes the visual information obtained at Step S2 and the pixels at the coordinates designated at Step S3.

The process from Steps 3 to 4 is repeated for all the coordinates where visual information needs to be synthesized (Step S5). Stereoscopic image storage 10 stores the image thus synthesized with the visual information (Step S6).

Figure 3C:
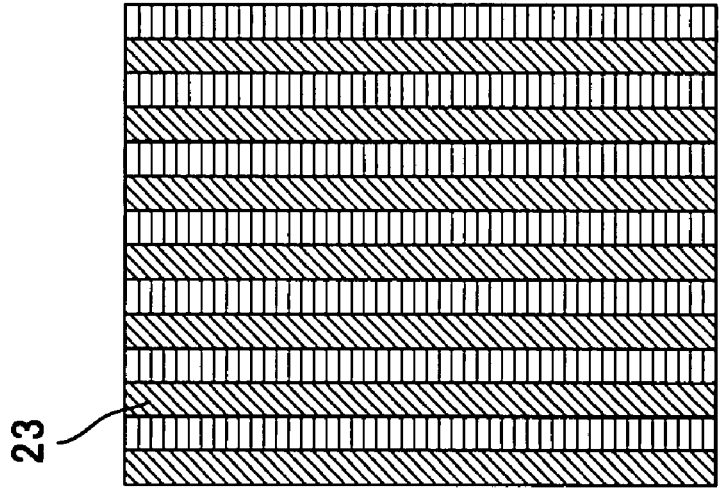
FIGS. 3A-3C are views for illustrating pixels to which visible information is added, in a first example embodiment.
Figure 3B:
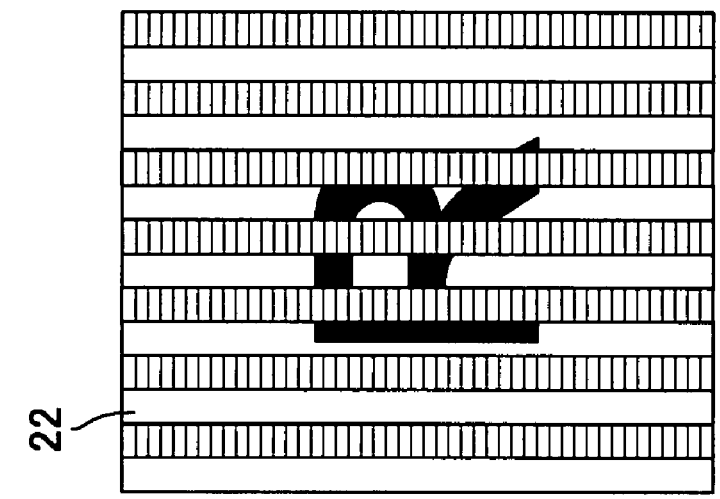
Figure 3A:
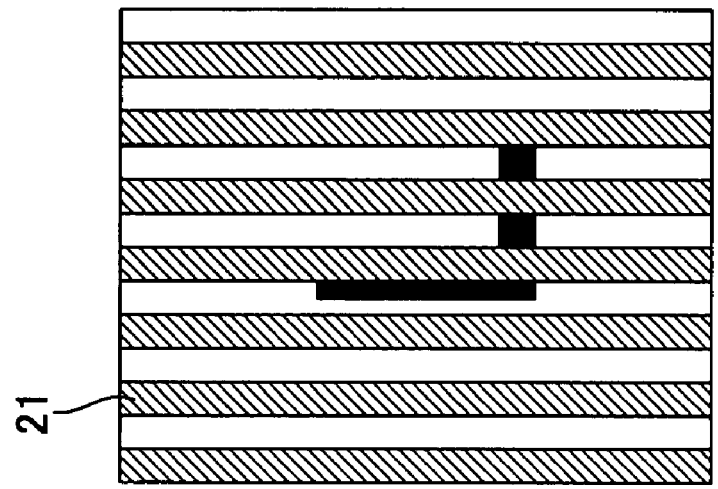

With the above synthesizing process done, as shown in FIGS. 3(a) and 3(b), the pattern 'L' indicating the left-eye image and the pattern 'R' indicating the right-eye image are combined respectively, in the even-numbered columns of pixels in left-eye image 21 and the odd-numbered columns of pixels in right-eye image 22 of the stereoscopic image. Accordingly, when the stereoscopic image after synthesis is displayed as a 2-dimensional image, it is possible to recognize the image as a stereoscopic image and also distinguish between the right-eye image and the left-eye image, from the added visual information. In FIGS. 3(a) and 3(b), the hatch patterns show sets of pixels to be used for creation for 3D display image representation (i.e., sets of pixels to be displayed when a stereoscopic representation is presented).

As shown in FIG. 3(c), as the stereoscopic image with visual information added thereto is used to create displayed image 23 for 3D display, the pixels with visual information combined are thinned out. As a result, exactly the same image as the displayed image for 3D display which is prepared from the image without visual information added thereto is obtained. As understood from the above description, it is not necessary on the 3D display side to recognize whether the stereoscopic image is added with visual information. Accordingly, the stereoscopic image combined with visual information by the image synthesizing apparatus of this embodiment has a characteristic that it can be stereoscopically displayed in the same manner as the stereoscopic image without visual information combined, without adding any change to the conventional 3D display.

Here, it is possible to aim at differentiation from other products by providing a configuration in which the visual information to be combined may include a company name of selling the 3D display apparatus and the like in addition to the information showing a mere distinction between the left and right, and when the stereoscopic image is displayed on a special 3D display, the information on the company name and the like will disappear so as to allow for comfortable stereoscopic vision. Further, it is also possible to combine various information such as information relating to the owner and copyright of the image and the like, as the visual information.

Further, since in the present embodiment the coordinates for synthesis of visual information are acquired from the 3D display information supplier, it is possible to support different kinds of 3D displays by modifying the information to be offered by the 3D display information supplier. For example, not limited to the 3D displays using a slit plate with vertical slits, 3D displays using a slit plate with oblique slits may also be handled. That is, even with the slit plate with oblique slits, visual information can be synthesized by acquiring the coordinates of the pixels that are unused for preparation of the displayed image for 3D display (not displayed on a 3D display) in the same manner described in the explanation of Step S3 in FIG. 2.

As described heretofore, in the first embodiment it is possible to add visual information to a stereoscopic image and display the image in stereoscopic representation on a 3D display without displaying this visual information.

It is noted that though in the present embodiment the stereo image with visual information is adapted to be stored into the stereoscopic image storage, instead of storing the stereoscopic image the stereoscopic image may be adapted to be output to an external 3D display.

Next, the second embodiment of the present invention will be described.

This embodiment handles a 3D display for allowing autostereoscopy having vertical slits arranged in front of its liquid crystal panel (which will be referred to hereinbelow as 3D display A) and a 3D display of a field-sequential (F/S) type using liquid crystal shutter glasses (which will be referred to hereinbelow as 3D display B).

The 3D display B displays the right-eye image and left-eye image alternately on the display capable of performing interlaced display and provides stereoscopic vision based on binocular parallax, by enabling the user, who uses liquid crystal shutter glasses synchronized with the visual representation of the display, to view the video by the left eye when the left-eye image is being displayed and by the right eye when the right-eye image is being displayed.

Figure 4A:
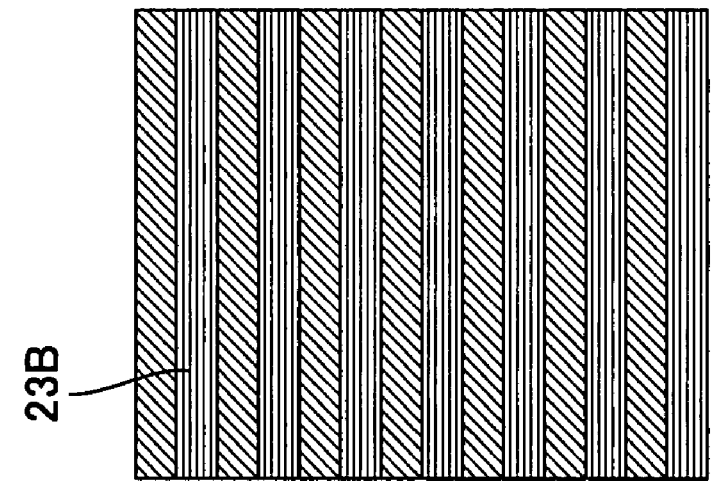
FIG. 4A, FIG. 4B, and FIG. 4C are views for illustrating a method for preparing a display image for a 3D display B.
Figure 4B:
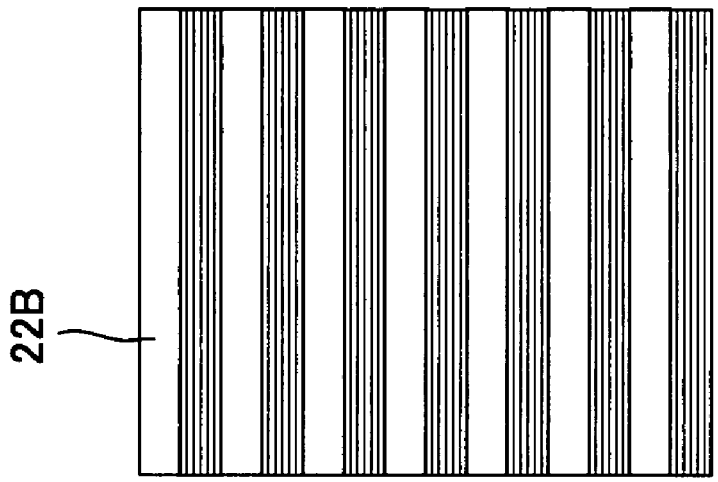
Figure 4C:
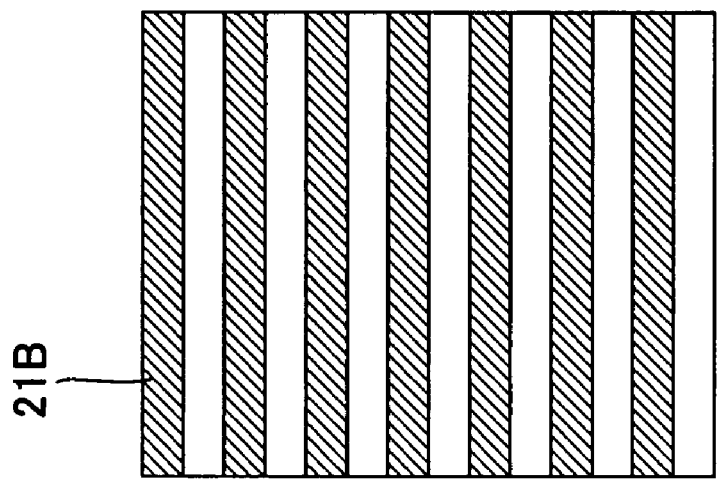

For example, a displayed image 23B for 3D display B shown in FIG. 4(c) is prepared by combining a left-eye image 21B in FIG. 4(a) and right-eye image 22B in FIG. 4(b), both made up of horizontal lines, line by line in an alternate manner in the vertical direction.

An image synthesizing apparatus 2 of the present embodiment is comprised of, as shown in FIG. 5, a stereoscopic image supplier 6, a visible information supplier 7, a 3D display information supplier (A) 8A, a 3D display information supplier (B) 8B, a stereoscopic display information synthesizer 11, an image synthesizer 9 and a stereoscopic image storage 10 (the common components with those in FIG. 1 are allotted with the same reference numerals). The 3D display information synthesizer 11, based on the 3D display information supplied from 3D display information suppliers 8A and 8B, acquires 3D display information on the coordinates that will not be used for the displayed image for any of the 3D displays.

The processing sequence of the operation of image synthesizer 9 is basically the same as that described in the first embodiment, so that the detailed description is omitted. Here, the difference from the first embodiment is the presence of 3D display information suppliers 8A and 8B, and the synthesizing process at 3D display information synthesizer 11 differs as detailed hereinbelow. As describing with the flowchart shown in FIG. 2, at Step S3, the 3D display information thus combined as above is acquired from 3D display information synthesizer 11, as the coordinates of the pixels over which visual information is synthesized. At Steps S4 to S5, visual information is synthesized with a stereoscopic image for every point of the coordinates.

Next, the detail of the process at 3D display information synthesizer 11 will be described.

Figure 6C:
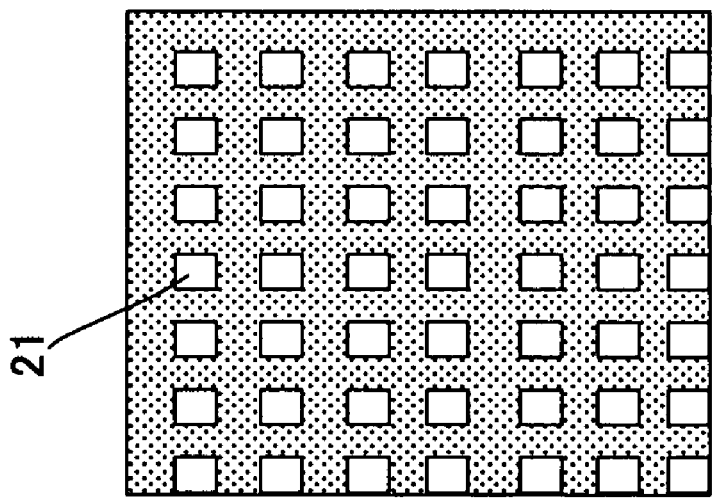
FIG. 6A, FIG. 6B, and FIG. 6C are views for illustrating pixels to which visible information is added, in a second example embodiment.
Figure 6B:
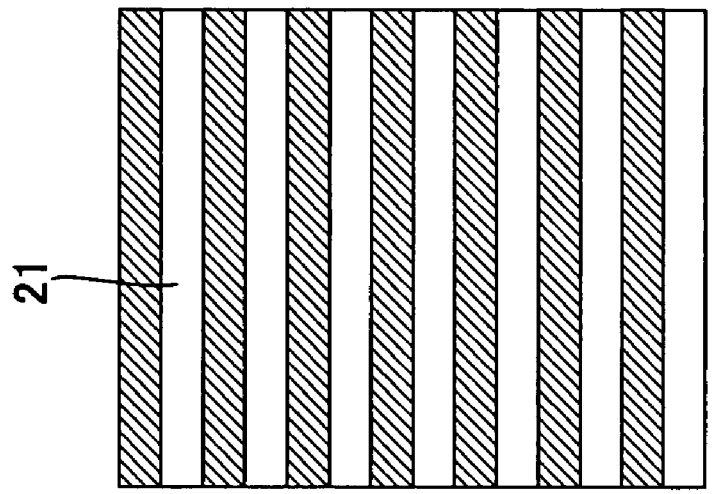
Figure 6A:
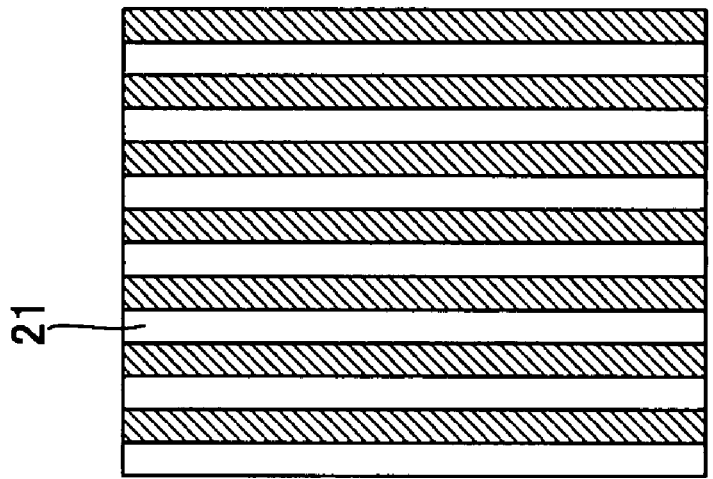
Figure 7A:
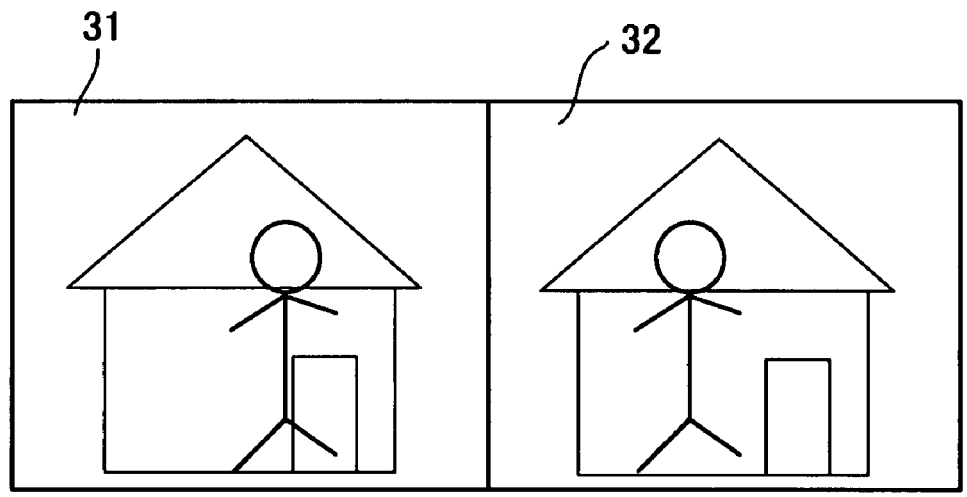
FIG. 7(a) and FIG. 7(b) are illustrations for explaining an image for parallel viewing mode and an image for crossed viewing mode in autostereoscopy.
Figure 7B:
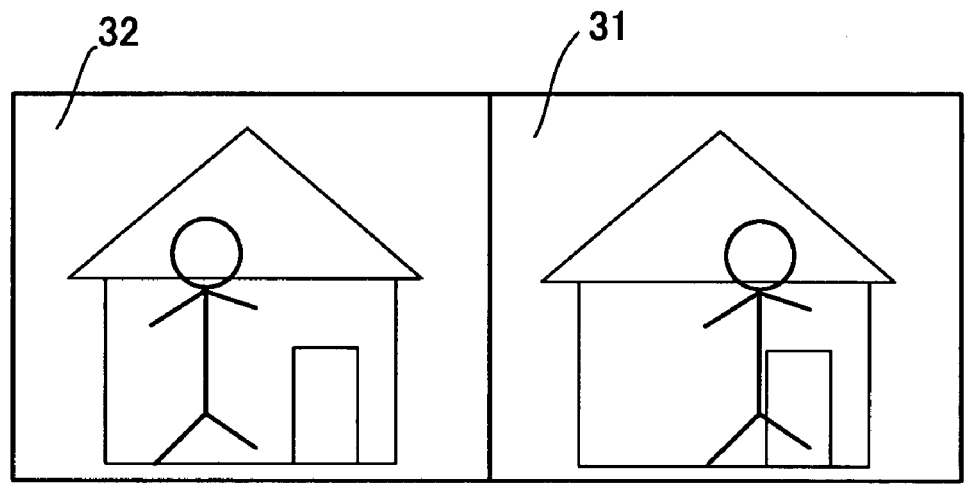
Figure 8A:
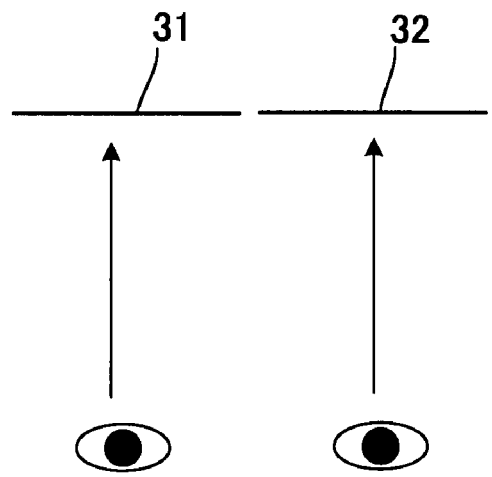
FIG. 8(a) and FIG. 8(b) are illustrations for explaining the positions of viewpoints for parallel viewing mode and the positions of viewpoints for crossed viewing mode in autostereoscopy.
Figure 8B:
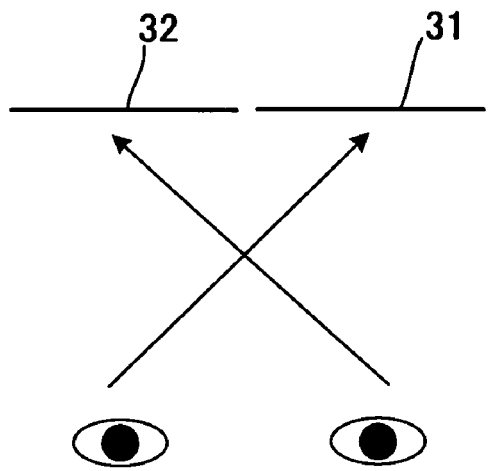
Figure 10:
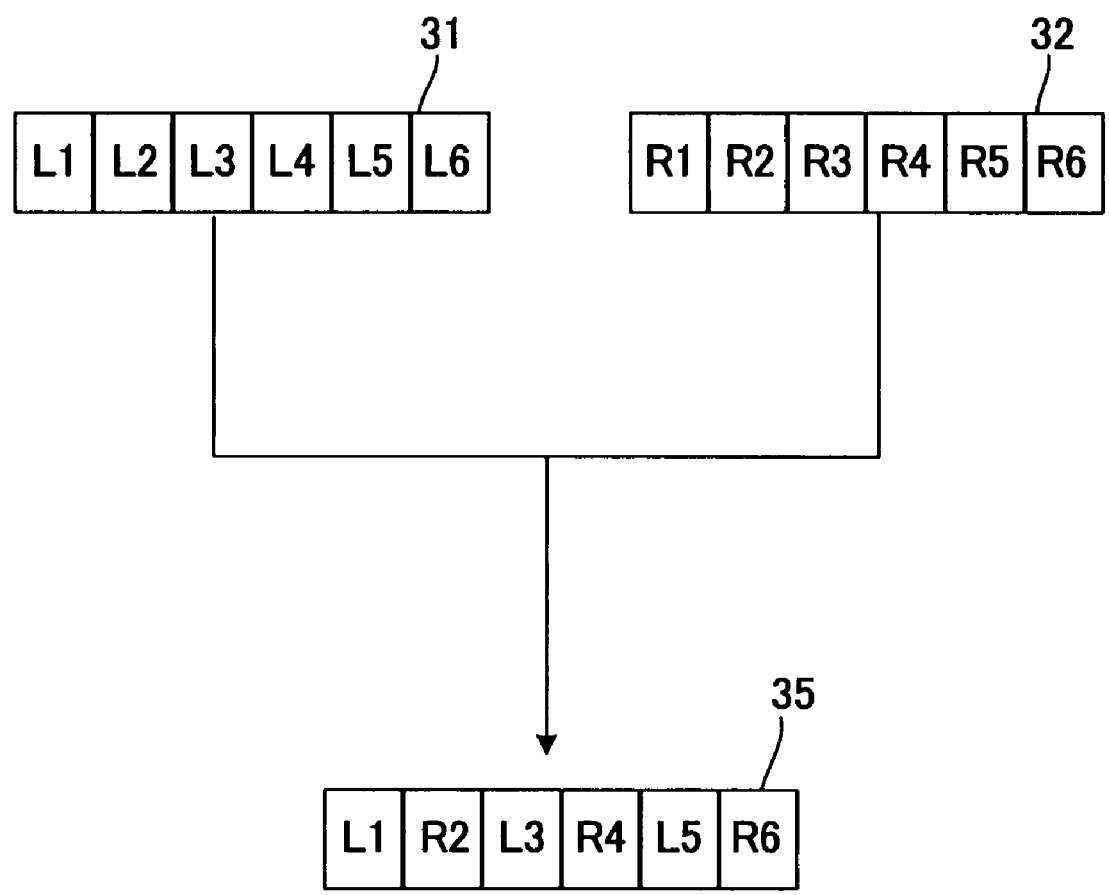
FIG. 10 is a view for explaining a method of preparing a displayed image for a 3D display.

Here, the hatch portions in FIG. 6(a) indicate sets of the pixels that are used from left-eye image 21 for synthesis of a displayed image for 3D display A and the white portions indicate sets of the pixels that will not be used for the synthesis. The hatch portions in FIG. 6(b) indicate sets of the pixels that are used from left-eye image 21 for synthesis of a displayed image for 3D display B and the white portions indicate sets of the pixels that will not be used for the synthesis. The white portions in FIG. 6(c) indicate sets of the pixels that will neither be used from left-eye image 21 for synthesis of a displayed image for 3D display A nor for synthesis of a displayed image for 3D display B. Accordingly, 3D display information synthesizer 11 acquires the coordinates for the points in odd-numbered columns and in even-numbered rows (the coordinates of white portions in FIG. 6(c)) from left-eye image 31 as the coordinates of pixels to which visual information is synthesized.

Similarly, for the right-eye image, the coordinates of the pixels that will neither be used for synthesis of a displayed image for 3D display A nor for synthesis of a displayed image for 3D display B is extracted to acquire the coordinates of pixels that will not be used for the representation in either of the 3D displays. Specifically, the coordinates of the positions located in even-numbered columns and in odd-numbered rows are the coordinates of the pixels on the right-eye image with which visual information is synthesized.

Though the above description presented a case where two kinds of 3D display schemes are present, 3D display information can be synthesized in the same manner even if there are three or more kinds of 3D display schemes. That is, the coordinates of the pixels to be thinned out by any of the plurality of 3D display schemes are determined to be the coordinates of the pixels with which visual information is synthesized.

As described heretofore, in the second embodiment it is possible to add visual information to a stereoscopic image and display the image in stereoscopic representation in a plurality kinds of 3D display schemes without displaying the visual information.

The invention claimed is:

1. An image synthesizing apparatus comprising:
a stereoscopic image input section configured to input a stereoscopic image;
a visual information input section configured to input visual information to be added to the stereoscopic image; and
a synthesizing section configured to synthesize the visual information and the stereoscopic image,
wherein the visual information is synthesized over a portion in the stereoscopic image at a coordinate that will not be used for stereoscopic representation and will be used when the stereoscopic image is displayed as a 2-dimensional image.

2. The image synthesizing apparatus according to claim 1, wherein the coordinate is a coordinate of a pixel to be thinned out from the stereoscopic image when the image is displayed in stereoscopic representation.

3. The image synthesizing apparatus according to claim 1, wherein the coordinate is a coordinate of a pixel to be thinned out from the stereoscopic image when the image is displayed in stereoscopic representation based on any of a plurality of stereoscopic display schemes.

4. An image synthesizing method comprising:
a stereoscopic image input step of inputting a stereoscopic image;
a visual information input step of inputting visual information to be added to the stereoscopic image; and
a synthesis step of synthesizing the visual information and the stereoscopic image,
wherein the visual information is synthesized over a portion in the stereoscopic image at a coordinate that will not be used for stereoscopic representation and will be used when the stereoscopic image is displayed as a 2-dimensional image.

5. The image synthesizing method according to claim 4, wherein the coordinate is a coordinate of a pixel to be thinned out from the stereoscopic image when the image is displayed in stereoscopic representation.

6. The image synthesizing method according to claim 4, wherein the coordinate is a coordinate of a pixel to be thinned out from the stereoscopic image when the image is displayed in stereoscopic representation based on any of a plurality of stereoscopic display schemes.

* * * * *